United States Patent

Hiemstra et al.

[11] 3,944,265
[45] Mar. 16, 1976

[54] EXHAUST SYSTEM CONNECTOR SEAL

[75] Inventors: John R. Hiemstra, Rosemount; Wayne M. Wagner, Apple Valley, both of Minn.

[73] Assignee: Donaldson Company, Inc., Minneapolis, Minn.

[22] Filed: Nov. 15, 1974

[21] Appl. No.: 524,061

[52] U.S. Cl. .................. 285/419; 24/279; 29/505; 29/526; 285/373
[51] Int. Cl.² .......................................... F16L 21/06
[58] Field of Search .......... 285/373, 419, 256, 382, 285/253; 29/505, 526, 452, 150, 516; 24/279

[56] References Cited
UNITED STATES PATENTS

| | | | |
|---|---|---|---|
| 1,146,813 | 7/1915 | Peterman et al. | 24/279 |
| 1,594,258 | 7/1926 | Hansen | 285/373 |
| 2,227,551 | 1/1941 | Morris | 285/373 |
| 2,314,236 | 3/1943 | Mott | 285/256 |
| 2,713,352 | 7/1955 | Schustack | 285/373 X |
| 2,787,051 | 4/1957 | Risley | 285/373 X |
| 3,087,221 | 4/1963 | Armstrong | 24/279 |
| 3,216,079 | 11/1965 | Keyworth | 29/452 X |
| 3,411,748 | 11/1968 | Fortune | 285/419 X |
| 3,708,834 | 1/1973 | Anderson et al. | 24/279 |
| 3,847,419 | 11/1974 | Brown | 285/382 X |

FOREIGN PATENTS OR APPLICATIONS

| | | | |
|---|---|---|---|
| 68,929 | 2/1930 | Sweden | 24/279 |

*Primary Examiner*—Thomas F. Callaghan
*Attorney, Agent, or Firm*—Merchant, Gould, Smith, Edell, Welter & Schmidt

[57] ABSTRACT

A method and apparatus for joining two tubular members in a strong, leak-proof fashion in which a band of ductile metal is passed around the adjacent ends of the members and circumferentially stressed beyond its elastic limit to conform intimately with the outer surfaces of the members throughout practically their entire circumstances. Several constructions for applying the circumferential forces are disclosed, and use is taught of a packing element to prevent paraxial or helical leakage.

16 Claims, 18 Drawing Figures

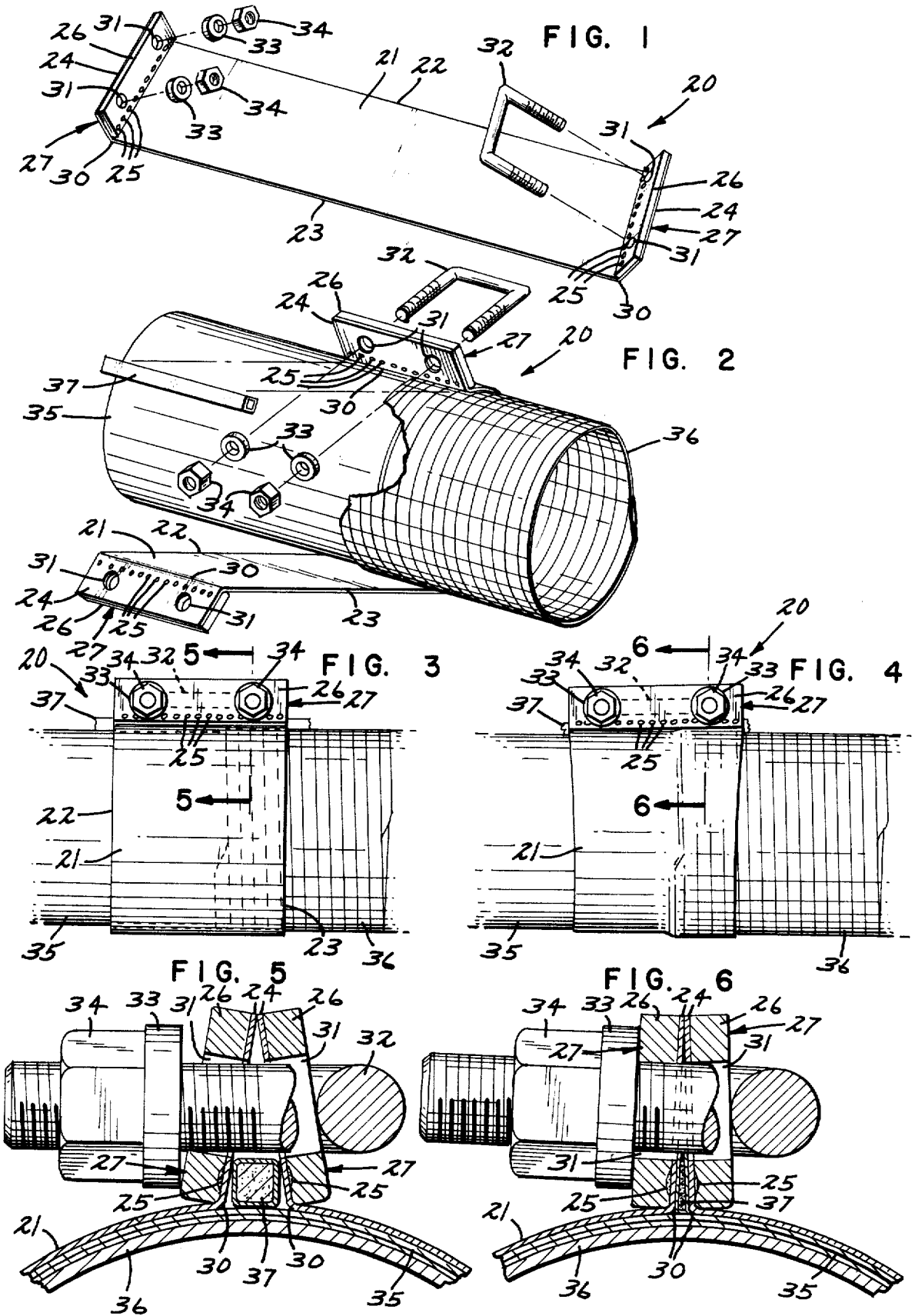

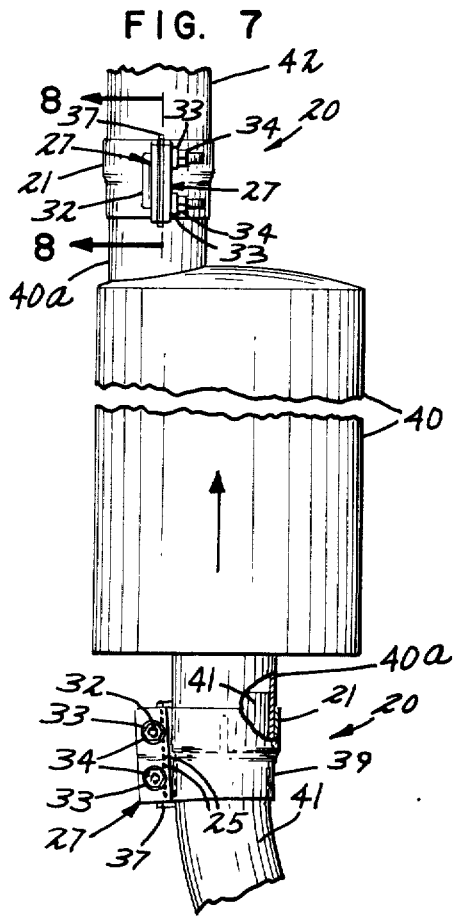
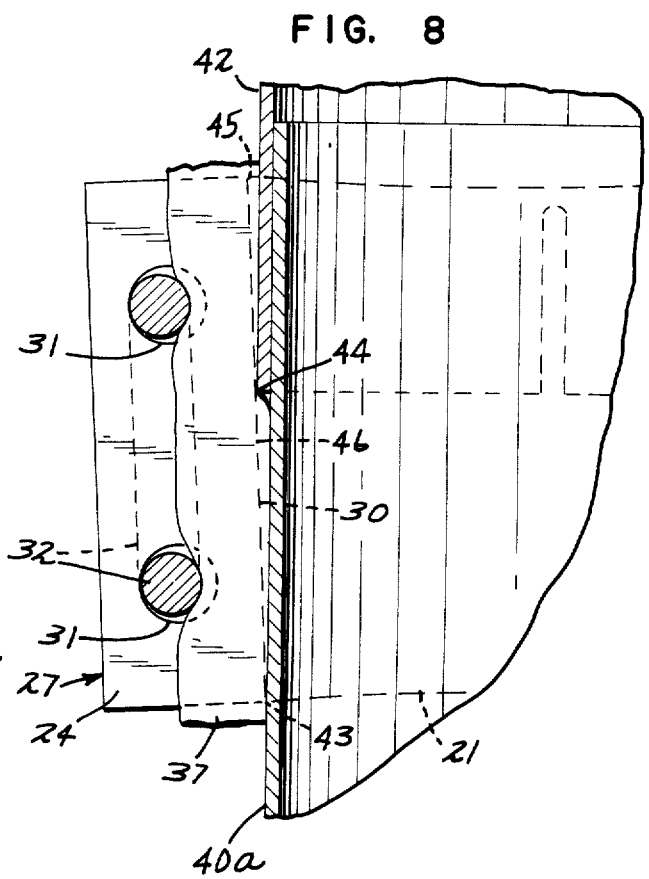
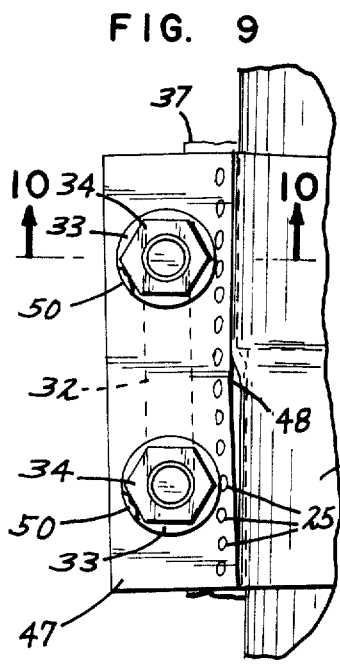
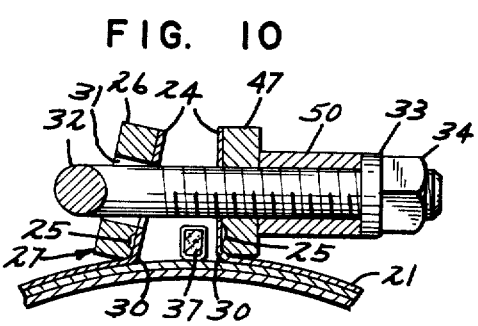
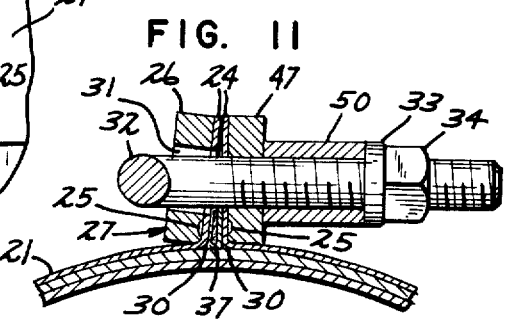
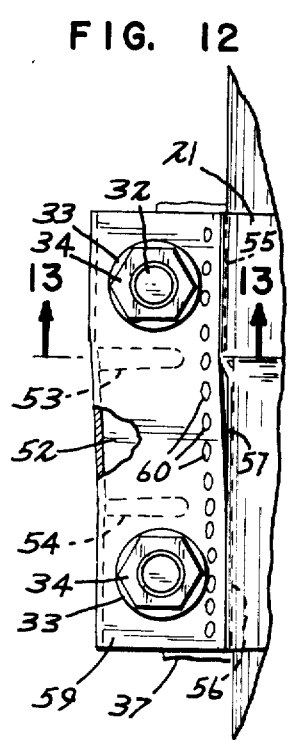

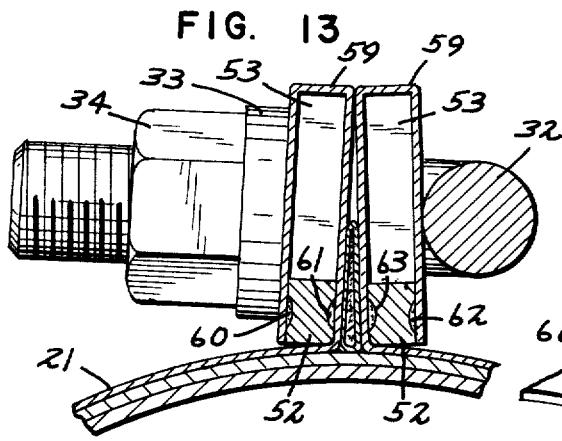
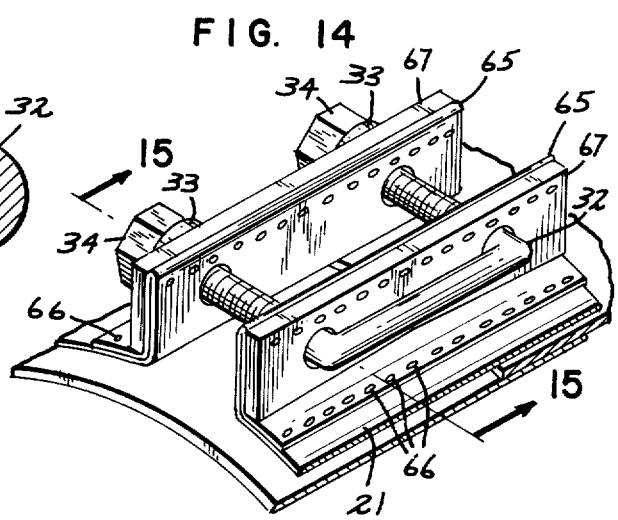
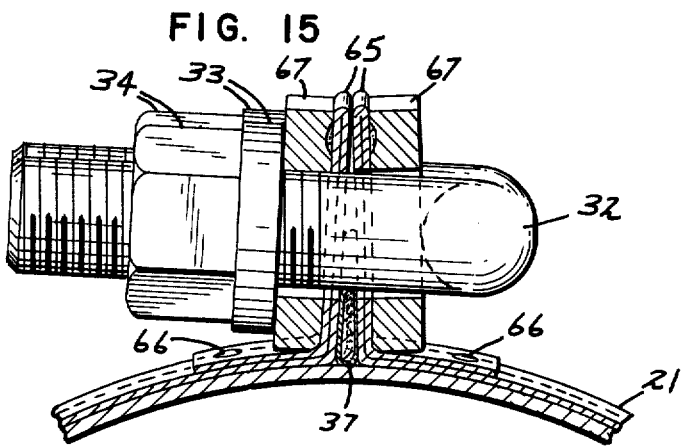
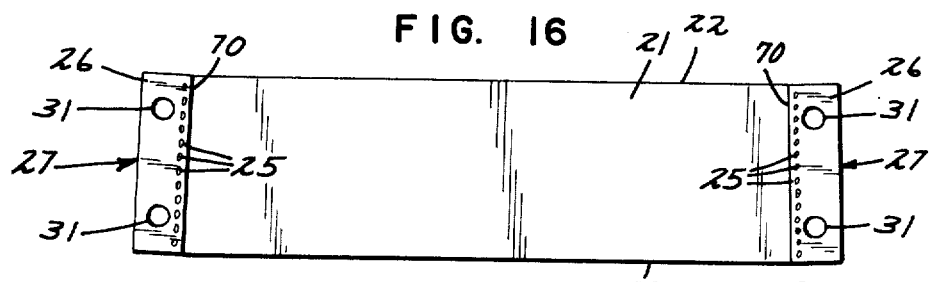
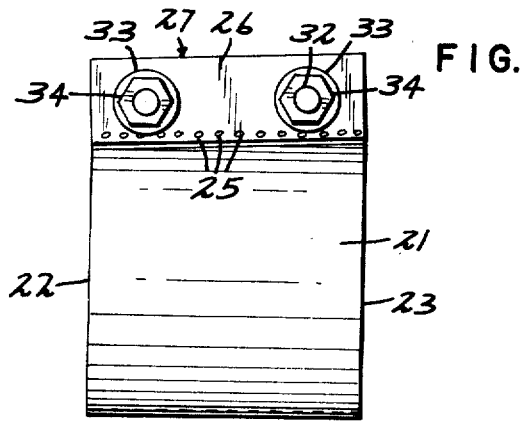
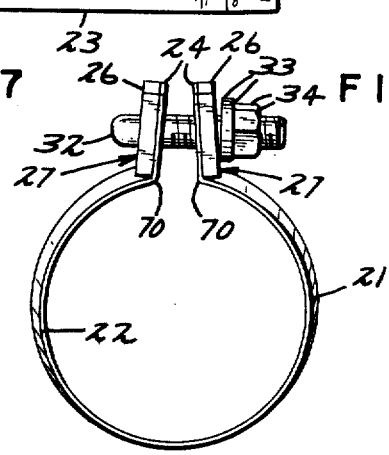

EXHAUST SYSTEM CONNECTOR SEAL

BACKGROUND OF THE INVENTION

This invention relates to the field of connectors, and particularly to means for joining two tubular conduits in end-to-end relation to give a tight and rigid joint. The invention may be used where the members are of the same diameter and are simply butted together, where one member is slotted to telescopically receive the other, or where one member is a rigid tube and the other is a flexible hose into which the first is inserted, the latter two cases of course involving tubular members of different although approximately the same diameter, the difference being the wall thickness of the outer tubular member or hose.

Although the invention is generally applicable with tubing and hoses of widely varying compositions, we have chosen to illustrate it as used with the rigid and flexible metal tubing and hoses associated with the exhaust systems of commercial trucking equipment, having diameters ranging mostly between two inches and six inches. In this field one tubular member is conventionally inserted into another and secured there by tightening a U-bolt against a semi-circular shoe, in what is known as a quillotine clamp or saddle clamp. This arrangement has the drawback that it deforms the cross sections of the tubes from circular to elliptical, so that stresses are not uniform and so that gases and sound leaks directed paraxially, that is, parallel to the axes of the members, frequently result. A further defect of the arrangement is that the narrow U-bolt frequently dimples the outer tubular member into the inner one, in such a fashion that when the U-bolt is removed it is impossible to disassemble the complete system without cutting the metal. Again, the U-bolt arrangement is very severe in its action on flexible metal hose, while at the same time being relatively inefficient in preventing leaks along the helical grooves in such hoses.

Efforts have been made to overcome the defects of U-bolt type clamps by use of closed cylinders generally of internal diameter to match the outside diameter of the tube being clamped, and with means for contracting the cylinder to give circumferential force acting substantially all the way around its periphery. A packing strip of some sort is desirable to seal the paraxial gap associated with the closure means. Such clamps must be positioned at the time the piping system is being assembled, although they need not be tightened until later, and they cannot be replaced without disassembling the system. Other structures are known, such as that disclosed in the Fortune U.S. Pat. No. 3,411,748, wherein a split cylinder of appropriate diameter is provided with ears which are pulled together to produce the necessary circumferential clamping force.

None of the prior art devices known to applicants have been suitable for use in joining tubular members of different sizes, as is necessary when one tube is inserted within another. Because of this it has been necessary to specially construct stepped clamp diameters to fit the two tubes being joined, one around the outside of a larger tube at its end, and one around the outside of the smaller tube where it emerges from the other. Sizes and modifications tend to proliferate in such structures to the point where mass production is no longer economically feasible.

SUMMARY OF THE INVENTION

A clamp or connector according to our invention can be installed in a tubing system after it has been assembled, and accommodates itself not only to tubes of the same diameter but also to tubes of approximately the same diameter such as telescoped tubes, gripping and sealing both the larger and the smaller tube without any special machining or size selection. Our structures further are easily packaged for shipment and storage since before use they are essentially flat and stack or nest very compactly.

Various advantages and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are listed and described certain preferred embodiments of the invention.

BRIEF DESCRIPTION OF THE DRAWINGS

In the drawing, FIG. 1 is a perspective view of a connector according to our invention prior to use;

FIGS. 2–4 show the steps in applying the connector to the joint between an inner, rigid metallic tube and an outer, flexible metallic hose;

FIGS. 5 and 6 are fragmentary sectional views taken on the lines 5—5 and 6—6 of FIGS. 3 and 4 respectively;

FIG. 7 shows a pair of our connecting devices in use in an engine exhaust line;

FIG. 8 is a fragmentary sectional view along the line 8—8 of FIG. 7;

FIG. 9 is a fragmentary view of a first modification of the invention;

FIGS. 10 and 11 are sectional views along the line 10—10 of FIG. 9 at two stages of assembly;

FIG. 12 is a view like FIG. 9 showing a further modification of the invention;

FIG. 13 is a fragmentary sectional view along the line 13—13 of FIG. 12;

FIG. 14 is a fragmentary perspective view of another embodiment of the invention;

FIG. 15 is a sectional view generally along the line 15—15 of FIG. 14, showing the connection after being tightened; and FIGS. 16–18 show a further modification of the invention.

DESCRIPTION OF THE PREFERRED EMBODIMENTS

The embodiment of the invention shown in perspective of FIG. 1 is a connection device 20 comprising a band 21 of ductile metal having parallel sides 22 and 23. The ends 24 of the band are cut off at right angles to the sides, and are secured as by rows 25 of spot welds or a seam weld to reinforcing bars 26, to form reinforced flat ribs 27 which are bent at dihedral angles with the main band along apices 30 which are also at right angles to the sides of the band. Spaced bores 31 pass through bars 36 and the ends 24 of the band beyond the rows of welds, for receiving clamping means shown to comprise a U-bolt 32, with cooperating washers 33 and nuts 34: it will of course be understood that a pair of individual bolts may be substituted for U-bolt 32 at some cost in inconvenience, if this is desired. It is to be noted that the dihedral angles are so formed that U-bolt 32 and washers 33 contact bars 26 rather than contacting ends 24 of band 21. In the form shown in FIG. 1 the connecting devices are readily and compactly nested for packing and shipment.

FIG. 2 shows how a connecting device according to the invention is applied to a joint between a rigid tube 35 and a flexible metal hose 36 into which the tube is inserted. Band 21 is simply wrapped around the joint, one-third to one-half of the width of the band overlying the larger diameter. The ends are brought into apposition and alignment, U-bolt 32 is passed through bores 31 in both ribs, and washers 33 and nuts 34 are loosely applied. Next a strip 37 of compressible packing material is inserted in the gap between ribs 27, under U-bolt 32. Before discussing what happens as nuts 34 are tightened, some data with regard to one typical installation may be helpful.

The illustration embodiment used "Stripwound" stainless steel hose 36 of 4 inches nominal inside diameter: the outside diameter was 4.19 inches. Rigid tube 35 of steel was 4 inches nominal outside diameter, with a wall thickness of 0.06 inches. band 21 was three and one-half inches wide and was of 0.018 inch thick stainless steel of "dead soft" temper. Bars 26 were one-quarter by one inch in cross section, bores 31 were one-half inch in diameter on two inch centers, and U-bolt 32 was a seven-sixteenths inch stock with a fine thread: bolt, nuts, and washers were grade five hardened steel, and the bight of the U-bolt was straight rather than curved, to contact bar 24 all along the space between the bores. By preference the edges of bars 26 adjacent the dihedral angles had their edges rounded. The length of band 21 between the dihedral angles was approximately 0.80 inches less than the actual circumference of hose 36.

Now when nuts 34 are tightened the band is drawn intimately against the outer circumference of tube 35 and hose 36. By reason of the original dihedral angles and the clamping forces involved, ribs 27 and first drawn into contact at their outer edges, as shown in FIG. 5. Further tightening of the nuts compresses packing 37 until a final condition such as that shown in FIGS. 4 and 6 is reached. In the course of this tightening the elastic limit of band 21 is intentionally exceeded, and the band permanently stretches, becoming narrower paraxially at its mid portion as it elongates, and increasing the intimacy of the contact between the band and the hose and tubing, to the point where the helical pattern of the hose becomes perceptible at the outer surface of the band. By reason of the different diameters, it follows that when nuts 34 are set down equally on the U-bolt, a portion of band 21 around hose 36 is stretched more severely than the portion around tube 35, and this in turn results in an arrangement in which the bars do not align with the tube axis, but extend slightly inwardly toward the smaller diameter, all as is shown in the drawing. Compression of packing 37 not only fills the paraxial gap between the ribs, as shown in FIG. 6, but also forces the packing material into the helical groove in the hose, so that gas and sound leaks, whether paraxial or helical, are efficiently sealed. The uniformity of application of the forces involved produces no non-circular distortion of the tubular members, and has no tendency to cause any dimpling or indentation to interfere with later disassembly of the system for service. The radial normal forces acting with the static coefficient of friction is the mechanism which holds the tubes and clamps tight or restrains the tubes from pulling apart against the forces from internal gas pressure or external exhaust system movement forces. Finally the connection device is capable of being applied after the system was assembled, and did not have to be put over hose 36 before tube 35 was inserted.

In FIG. 7 a pair of connectors 20 according to the invention are shown in use to connect an engine muffler 40 between a first tube 41 leading to the exhaust manifold of the engine and a second tube 42 leading to the atmosphere. Muffler stub tube 40a is slotted and overlies connection tube 41, while connection tube 42 is slotted and overlies muffler stub tube 40a, as shown in FIGS. 7 and 8, to permit it to be closed down tightly in a leak tight joint. These figures show how the circumferential force applied stresses the ductile band, drawing it tightly about both the larger and the smaller tube except along the gap filled by packing 37. FIG. 8 shows even more clearly than FIG. 4 how the ribs are drawn out of parallel with the tube axes into an oblique relation therewith.

The tube 41 is shown in FIG. 7 to comprise an elbow, and the figure makes it clear that band 21 in drawing up is capable of adapting itself as at 39 to the curve in tube 41.

In FIG. 8 it is also evident that the apex of the dihedral angle contacts the body of the smaller tube, at 43, and the end of the larger tube, at 44, but is out of contact at its top edge 45 and just below the end of the outer tube at 46. This can be remedied in part by the modification of the invention shown in FIG. 9. Here the edge of bar 47 is not rectilinear but is very shallowly V-shaped, the root of the V being at 48, at the bottom of the outer tube.

Reference to FIG. 5 shows that the first embodiment of the invention, the ribs are not at all parallel, particularly in the initial tightening stages. The bores are larger than the clamping means to allow this, but even then there is some possibility of catching of the U-bolt threads on the edges of the adjacent bar 26. To avoid this, the modification of FIGS. 9, 10 and 11 has a pair of bosses 50 secured to bar 47, at the location of the bores, and the bores pass through both the bar and the bosses and are no larger than is required to comfortably pass the U-bolt legs. The bores in the other bar are oversized as before. This arrangement prevents cocking of the U-bolt in the bores, and facilitates smooth movement of the U-bolt in drawing the band around the tubular members.

Parenthetically it may be remarked that while for initial investigations the outer surfaces of the tubular members were lubricated before the connector was applied, experience has made it evident that with bands of appropriate ductility no lubrication whatever is necessary.

FIGS. 12 and 13 show a bar structure alternative to that shown in FIG. 9 in correcting for the effect pointed out in connection with FIG. 8. Bars 52 are provided with slots 53, 54 between the bores, the slots extending quite deeply into the bars to permit the latter to deform under the action of the clamping means. As shown in FIG. 12, slot 53 has opened slightly, and slot 54 has closed slightly, under the clamping force, at the outer edge of the bar, allowing it to assume a slightly zigzag shape in which an appreciable portion of the dihedral angle contacts the larger tube, near 55, and another appreciable portion of the dihedral angle contacts the smaller tube near 56, leaving only a relatively small intermediate area 57 where there is bridging rather than direct contact.

FIG. 13 more distinctly shows a further possible modification. Here the ends 59 of the band 21 not only contact the faces of reinforcing bars 52, but in fact go completely around them, being welded thereto both outwardly and inwardly at 60, 61 and 62, 63.

A somewhat different embodiment is shown in FIGS. 14 and 15. Here the ends 65 of band 21 are doubled back and welded to the band at 66 before being formed into dihedrals and being welded to bars 67 near their outer edges. Packing 37 is of course made a part of each of the various joints described.

FIGS. 16-18 show one further embodiment of the invention. The structure here differs from FIG. 1 in that the apices 70 of the dihedral angles are not at right angles to the sides of band 21, but converge slightly. This gives the connection when formed a configuration which departs slightly from the cylindrical even before the distorting circumferential forces are applied, so that the condition of FIG. 8 is more readily achieved with less differentially longitudinal stretching of the band.

From the foregoing it will be evident that we have devised new and improved means for sealingly connecting tubular elements, and that this means is characterized by a construction in which a surrounding band can be circumferentially stressed past its elastic limit to closely and securely conform to the configurations of tubular elements being joined even though they may be of different diameters by as much as 0.25 inches.

Numerous characteristics and advantages of our invention have been set forth in the foregoing description, together with details of the structure and function of the invention, and the novel features thereof are pointed out in the appended claims. The disclosure, however, is illustrative only, and changes may be made in detail especially in matters of shape, size and arrangement of parts, within thee principle of the invention, to the full extent indicated by the broad general meaning of the terms in which the appended claims are expressed.

What is claimed is:

1. The method of joining two substantially incompressible tubular members axially which comprises bending a flat band of ductile metal around the adjacent ends of the members in direct superficial contact with said members and circumferentially stressing the band beyond its elastic limit to cause it to conform to the surfaces of the members throughout substantially their entire circumference the ductile metal band being such that it yields before the material of said member.

2. The method of claim 1 in which the members are of slightly different diameters.

3. The method of claim 2 in which one of the members is telescopically received within the other.

4. The method of claim 1 in which one of the tubular members is a flexible metallic hose, and the circumferential forces are sufficient to perceptibly mold the band into the hose configuration.

5. The method of claim 1 with the further step of retaining said band in a stressed condition past the elastic limit of a metal.

6. In combination:

a pair of substantially incompressible tubular members of generally the same outside diameter to be joined in end to end relation;

a band ductile metal initially of strip form having end portions and bent to circular shape whereby the end portions confront one another, said band surrounding the joint between said members, the width of said band being generally the same as the diameters of said members, and a substantial portion of the width of said band engaging each of said members in direct contact therewith;

and means circumferentially stressing said band beyond its elastic limit, whereby to draw the band into intimate sealing engagement with the outer surfaces of said members, and maintaining said engagement when achieved, the ductile metal band being such that it yields before the material of said members.

7. The structure of claim 6 in which the last named means includes a pair of reinforced flat ribs integral in part with said band and forming dihedral angles therewith, and clamping means mechanically drawing said ribs into mutual flat contact in a plane containing the axes of said members, whereby to produce the circumferential stress in said band, the length of said band between said ribs being less than the circumferences of said members, so that when the clamping means are tightened said band is stressed beyond its elastic limit and deforms into intimate superficial engagement with the member.

8. Apparatus according to claim 7 in which each of said ribs includes a bar secured to an end of said band and provided with bores adapted to be brought into alignment for receiving said clamping member.

9. Apparatus according to claim 8 in which said bar and said band are joined by spot welding along a line between the dihedral angle and said bores.

10. Apparatus according to claim 7 in which the apices of said dihedral angles are oblique with respect to the center line of said band.

11. Apparatus according to claim 8 in which at least one of said bars includes transverse slots between said bores to permit deformation of said bar to accommodate tubular members of somewhat different diameters.

12. Apparatus according to claim 9 in which at least one end of said band is doubled on itself prior to the formation of the dihedral angle, and in which the weld spots traverse both thicknesses of said band and extend along a line outside said bores.

13. Apparatus according to claim 12 in which the end of said band after doubling is welded to the body of the band.

14. Apparatus according to claim 8 in which one of said bars includes a pair of lateral extensions through which said bores pass to prevent cocking of said bar with respect to said clamping means, said bores in said one bar being of the same diameter as said clamping means, and said bores in the other bar being larger than said clamping means.

15. Apparatus according to claim 8 in which at least one end of said band is wrapped around the associated bar for traversal by said clamp means, of both layers of said wrap, both of said layers being spot welded to the bar along a line between the dihedral angle and said bores.

16. Apparatus according to claim 7 in which one of said tubular members is of somewhat larger diameter than the other, and approximately one-third the width of said band overlies the larger of said members.

* * * * *